(12) United States Patent
Tucker

(10) Patent No.: US 6,595,536 B1
(45) Date of Patent: Jul. 22, 2003

(54) COLLAPSIBLE VEHICLE

(76) Inventor: Timothy R. Tucker, 90 Forest Hill Dr., Rochester, NY (US) 14625

( * ) Notice: Subject to any disclaimer, the term of this patent is extended or adjusted under 35 U.S.C. 154(b) by 0 days.

(21) Appl. No.: 09/721,830

(22) Filed: Nov. 24, 2000

Related U.S. Application Data

(60) Provisional application No. 60/184,532, filed on Feb. 24, 2000, and provisional application No. 60/173,570, filed on Dec. 29, 1999.

(51) Int. Cl.$^7$ .................................................. B62K 1/00
(52) U.S. Cl. ...................................... 280/278; 280/287
(58) Field of Search ................................ 280/278, 287, 280/281.1, 274

(56) References Cited

U.S. PATENT DOCUMENTS

| | | | |
|---|---|---|---|
| 4,448,437 A | | 5/1984 | Montague |
| 4,460,191 A | * | 7/1984 | Ishibashi et al. ............. 280/278 |
| 5,186,482 A | * | 2/1993 | Sapper ........................ 280/278 |
| 5,224,726 A | * | 7/1993 | Gill ............................ 280/278 |
| 5,590,895 A | | 1/1997 | Hiramoto |
| 5,785,338 A | | 7/1998 | Chang |
| 5,836,602 A | | 11/1998 | Wang |
| 5,975,551 A | | 11/1999 | Montague et al. |
| 6,032,971 A | * | 3/2000 | Herder ........................ 280/278 |
| 6,116,629 A | | 9/2000 | Koppensteiner |
| 6,131,683 A | | 10/2000 | Wada |
| 6,135,478 A | | 10/2000 | Montague |

FOREIGN PATENT DOCUMENTS

| | | | | |
|---|---|---|---|---|
| EP | 0505598 | * | 9/1992 | ................. 280/287 |
| FR | 56464 | * | 9/1952 | ................. 280/278 |

OTHER PUBLICATIONS

Brompton Bike website Gallery Preface at http://www.bromptonbike.com/CurrentEvents/GalleryList.html; 1 page; date unknown.
Citybug–Electric Scooter at http://www.caribike.com/citybug.htm; 1 page; date unknown.
Strida Send Bike Demo page at http://www.strida.com/demo/demo.html; 1 page; date unknown.
PBW Bikes Rohloff Speedhub 500/14 and SRAM 3×7 . . . page at http://www.pbwbikes.com/foldmtb.html; 3 pages; (c) 2000.

* cited by examiner

Primary Examiner—Daniel G. DePumpo
(74) Attorney, Agent, or Firm—Greenwald & Basch LLP; Duane C. Basch

(57) ABSTRACT

The present invention is a collapsible two-wheeled vehicle, wherein the vehicle comprises a down tube and a horizontal stay that are pivotably connected to one another at midsections thereof as well as being slidably connected to steering and seat assemblies, respectively. The slightly canted arrangement of the various members and assemblies provides a rigid structure to support an operator during use yet allows the vehicle to be collapsed to a compact size for storage and shipping. The vehicle may be folded or collapsed in the form of an "X", bringing the wheels into a side-by-side position, to reduce its overall size without compromising its structural rigidity when reopened.

20 Claims, 17 Drawing Sheets

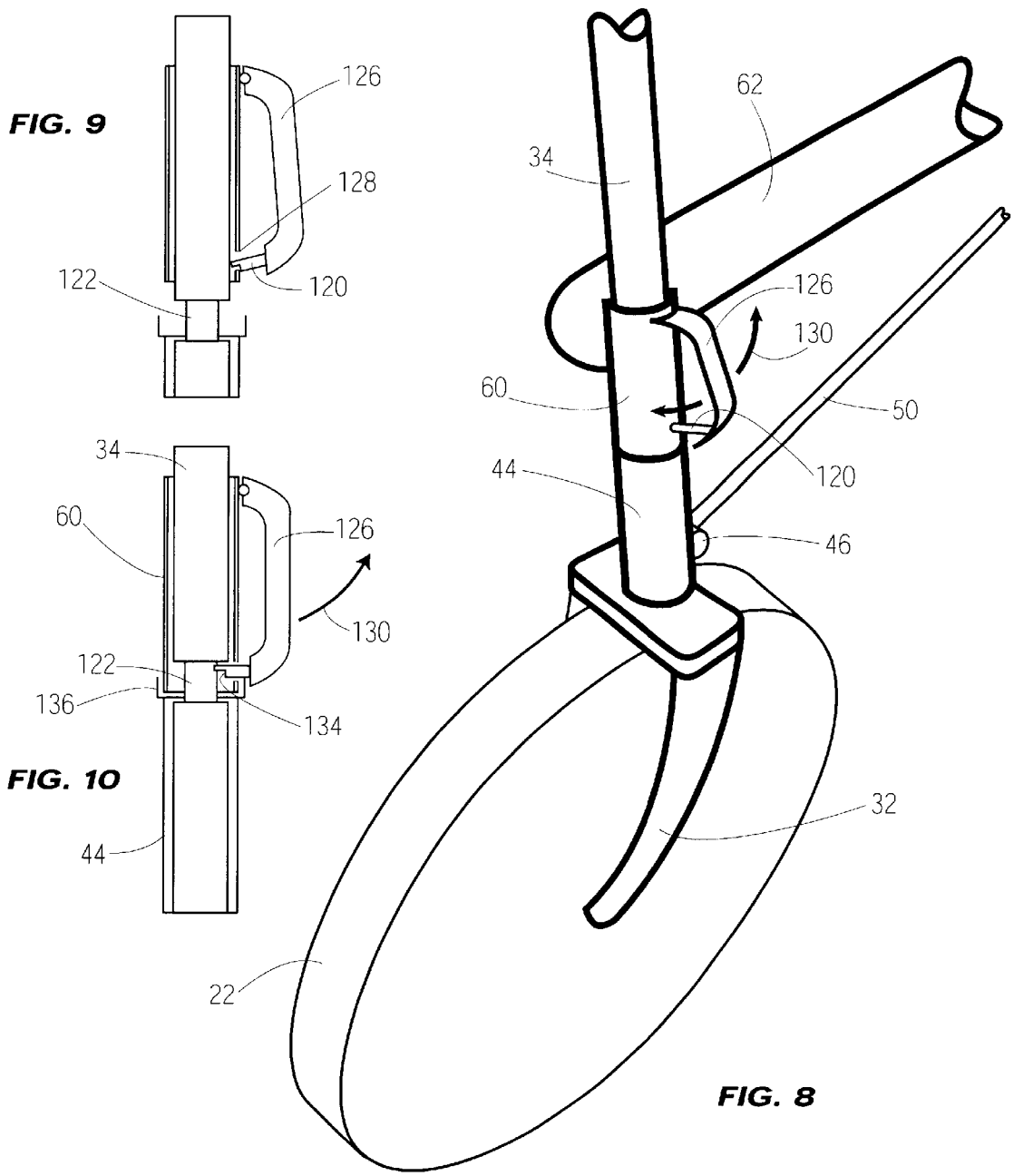

COLLAPSIBLE VEHICLE

CROSS REFERENCE

Priority is claimed under 35 U.S.C. 119(e) for Provisional Application Serial No. 60/173,570, for a "COLLAPSIBLE BICYCLE," filed Dec. 29, 1999 and Provisional Application Serial No. 60/184,532, for a "COLLAPSIBLE BICYCLE," filed Feb. 24, 2000, both by the inventor of the instant application, and hereby incorporated by reference for their teachings.

This invention relates generally to a collapsible vehicle such as a bicycle and more particularly to a bicycle that may be collapsed in a single motion to significantly reduce the size of the bicycle for shipping and/or storage.

BACKGROUND AND SUMMARY OF THE INVENTION

The present invention is a collapsible vehicle such as a bicycle designed to provide improved rigidity in its construction while minimizing the space required to store or ship the bicycle. Size reduction is preferably accomplished by an improved, pivoting design wherein the frame include angled elements that allow the bicycle frame to be collapsed to a point where the front and rear wheels of the collapsed bicycle are generally adjacent one another.

Heretofore, a number of patents and publications have disclosed various folding bicycle configurations, the relevant portions of which may be briefly summarized as follows:

Various folding bicycle configurations disclose embodiments where a front frame pivots relative to a rear frame. For example, U.S. Pat. No. 4,448,437 and U.S. Pat. No. 6,135,478, to Montague disclose a folding bicycle wherein the bicycle is collapsed by pivoting a front and rear frame relative to one another about the set down tube. U.S. Pat. No. 5,590,895 to Hiramoto, issued Jan. 7, 1997, teaches a collapsible bicycle frame where a front frame pivots about a hinge to fold the front wheel and head tube adjacent to the rear wheel and frame. U.S. Pat. No. 5,785,338 to Chang, issued Jul. 28, 1998, depicts a collapsible bicycle where a rear end of the front frame pivots relative to the rear frame so as to collapse with handle bars adjacent the rear wheel.

U.S. Pat. No. 6,032,971 to Herder, issued Mar. 7, 2000, discloses a folding bicycle where all of the pivoting members have horizontal pivot axes and are indirectly connected to a single collar that slides up and down a seat post.

Similar collapsible vehicle designs are depicted on various websites, including, for example, htt://www.pbwbikes.com/foldmtb.html, Copyright 2000, Peregrine Bicycle Works, Inc.

Generally, prior art collapsible bicycle designs require an operator to latch, tighten, or otherwise secure at least one hinged joint or element of the bicycle in order to make sure it is safe to operate and that the structure has sufficient rigidity to support an operator. As will be understood from the following description, the present invention seeks to overcome some of these drawbacks and to provide an improved collapsible bicycle design that may be folded or opened in a single motion.

In accordance with the present invention, there is provided a two-wheeled vehicle, comprising: a first wheel rotatably affixed to an axle passing therethrough; a drive wheel rotatably affixed to an axle passing therethrough; a steering assembly operatively connected to the axle of the first wheel so as to cause the first wheel to pivot about a generally vertical axis under the control of an operator, thereby enabling the first wheel to change the direction of the two-wheeled vehicle; a down tube having a first end slidably connected to said steering assembly, and a second end suitable for connection to said drive wheel; a seat assembly including a first end pivotably connected to said first longitudinal member and a second end upon which a seat to support the operator is adjustably attached; and a horizontal stay having a first end slidably connected to said seat assembly, and a second end pivotably affixed to said steering assembly, wherein the two-wheeled vehicle may be collapsed to a smaller size by slidably moving the down tube and horizontal stay members relative to the steering and seat assemblies, respectively.

In accordance with another aspect of the invention, there is provided A bicycle, comprising: a front wheel rotatably affixed to a steering assembly, wherein the steering assembly enables a user to change direction of the bicycle; a down tube having both a pair of chain stays and a pair of seat stays, said down tube being slidably connected to said steering assembly; a drive wheel rotatably affixed between the chain and seat stays of said down tube; a seat assembly including a first end pivotably connected to said down tube and a second end upon which a seat to support the operator is adjustably attached; a horizontal stay pivotally connected near its center to the down tube, slidably connected at one end to the seat assembly and pivotally connected at the opposite end to the steering assembly; wherein the down tube is pivotably attached to a slidable sleeve of the steering assembly and where the pivotably attached down tube in combination with the slidable sleeve, allow the bicycle to be collapsed.

One aspect of the invention deals with a basic problem often encountered with collapsible bicycles, that of providing a stable and secure structure for the "assembled" bicycle. Another aspect of the present invention deals with a problem of collapsing the bicycle so as to move the front and rear wheels to a position essentially adjacent one another. Such a configuration allows for more compact storage, and may further provide an easier means of transporting the collapsed bicycle by rolling it on its wheels. In particular, various designs rely on pivots and locking mechanisms that compromise the structural rigidity and safety of the assembled unit, or require hand tools to open or collapse the bicycle.

These aspects are further based on the discovery of techniques that alleviate the known problems. The technique provides for a collapsible bicycle that is structurally rigid yet does not require tools to complete the "assembly" before an operator may ride the bicycle. In particular, the technique employs a plurality of slidable and pivotable joints to interconnect elements of the bicycle that allow the bicycle to be folded or opened in a single motion.

The techniques described herein are advantageous because they result in a simple, easy-to-assemble bicycle that can be stored in an upright storage location (e.g., closet), standing under its own support and requiring minimal space. Further advantages of the invention are a fully adjustable handle-bar (steering) and seat so as to provide a collapsible bicycle that is easily customized to the size of the operator.

BRIEF DESCRIPTION OF THE DRAWINGS

FIGS. 8–10 are views illustrating the detail and operation of a locking mechanism on the sliding head tube;

Figure 1:
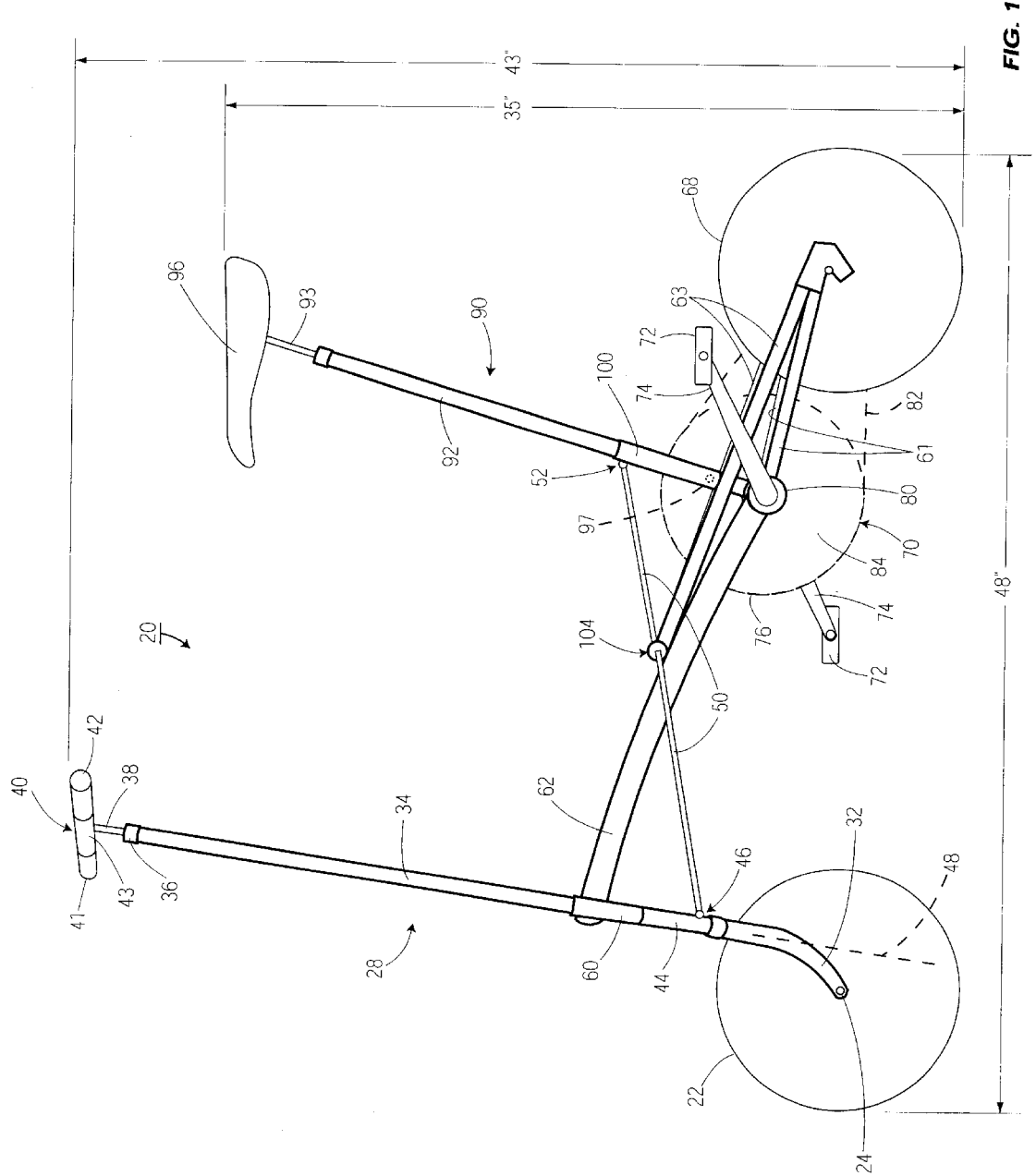
FIG. 1 is an orthographic left side-view of the collapsible bike in an opened configuration.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "bicycle" has been used herein to represent a two-wheeled vehicle. However, the term is not intended to be limited to an operator-propelled apparatus, and is intended to include alternative vehicle designs as disclosed herein and equivalents thereof.

Figure 3:
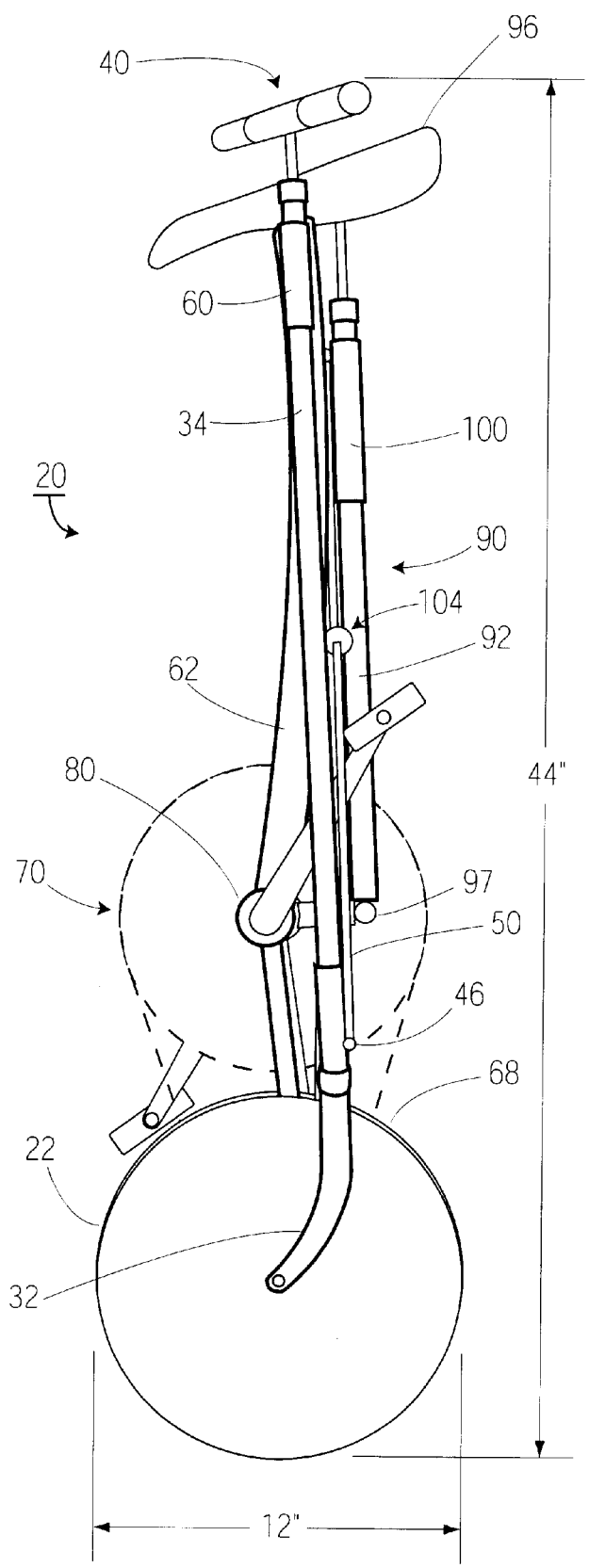
FIG. 3 is an orthographic left side-view of the bicycle in a collapsed or folded configuration.
Figure 4:
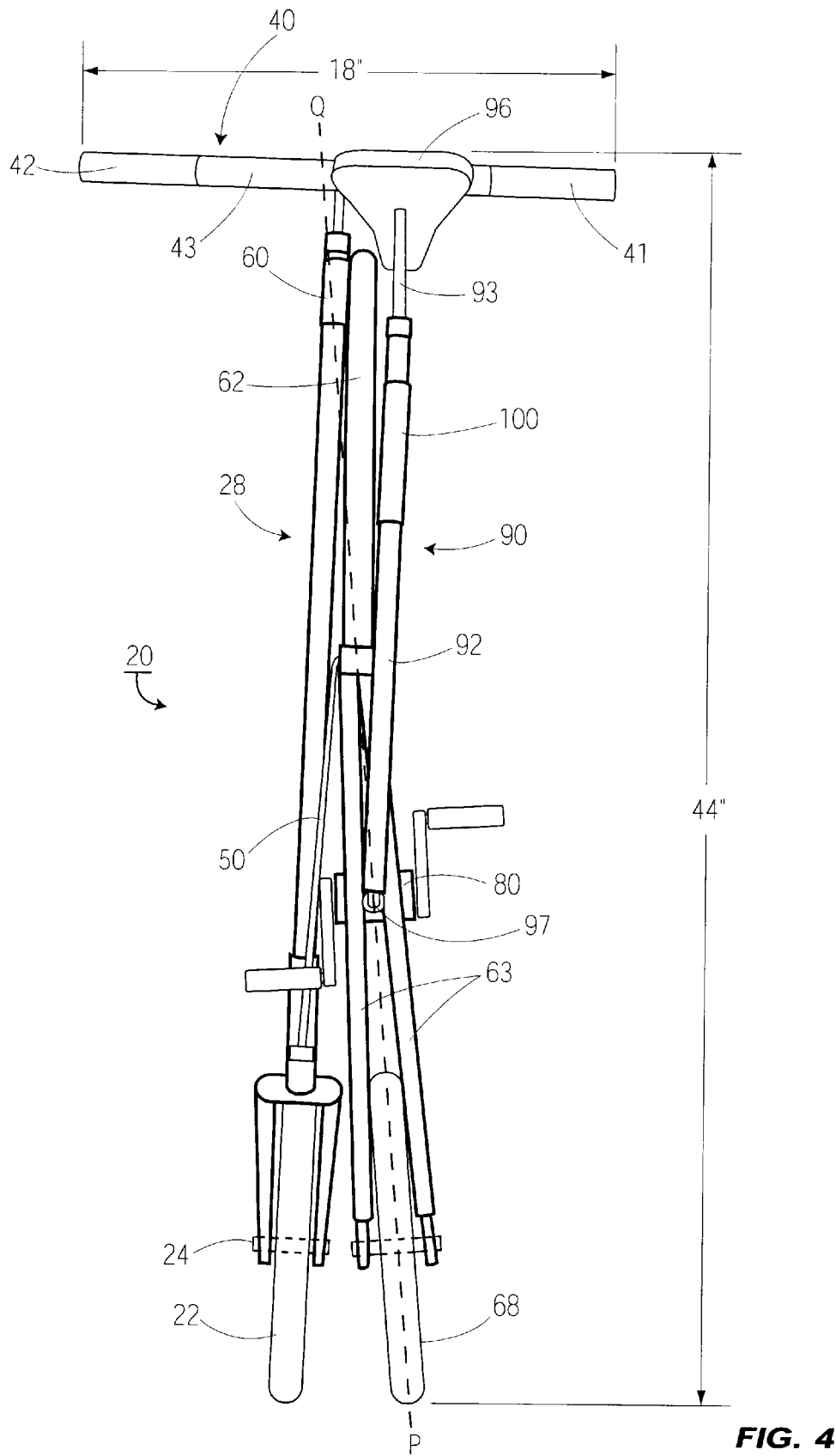
FIG. 4 is an orthographic rear-view of the bicycle in a collapsed or folded configuration.
Figure 5:
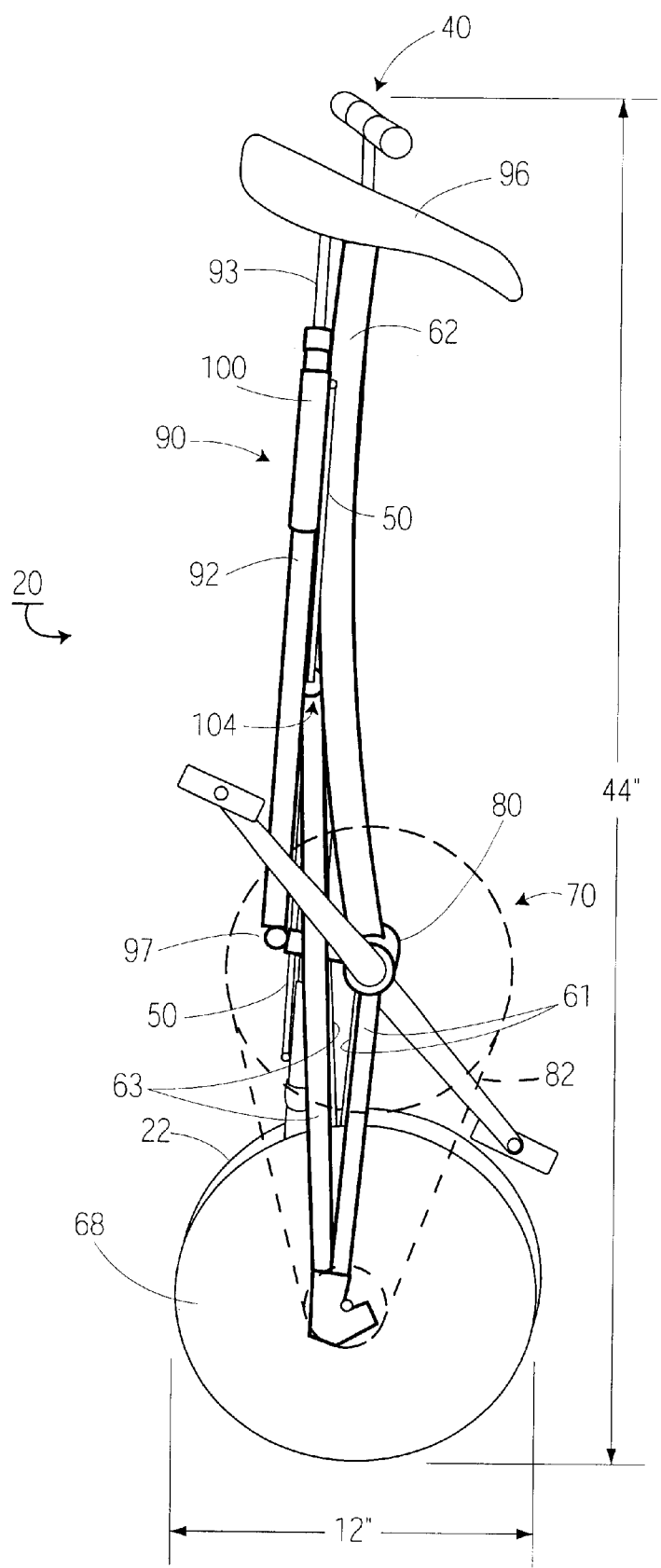
FIG. 5 is an orthographic right side-view of the bicycle in a collapsed or folded configuration.
Figure 6:
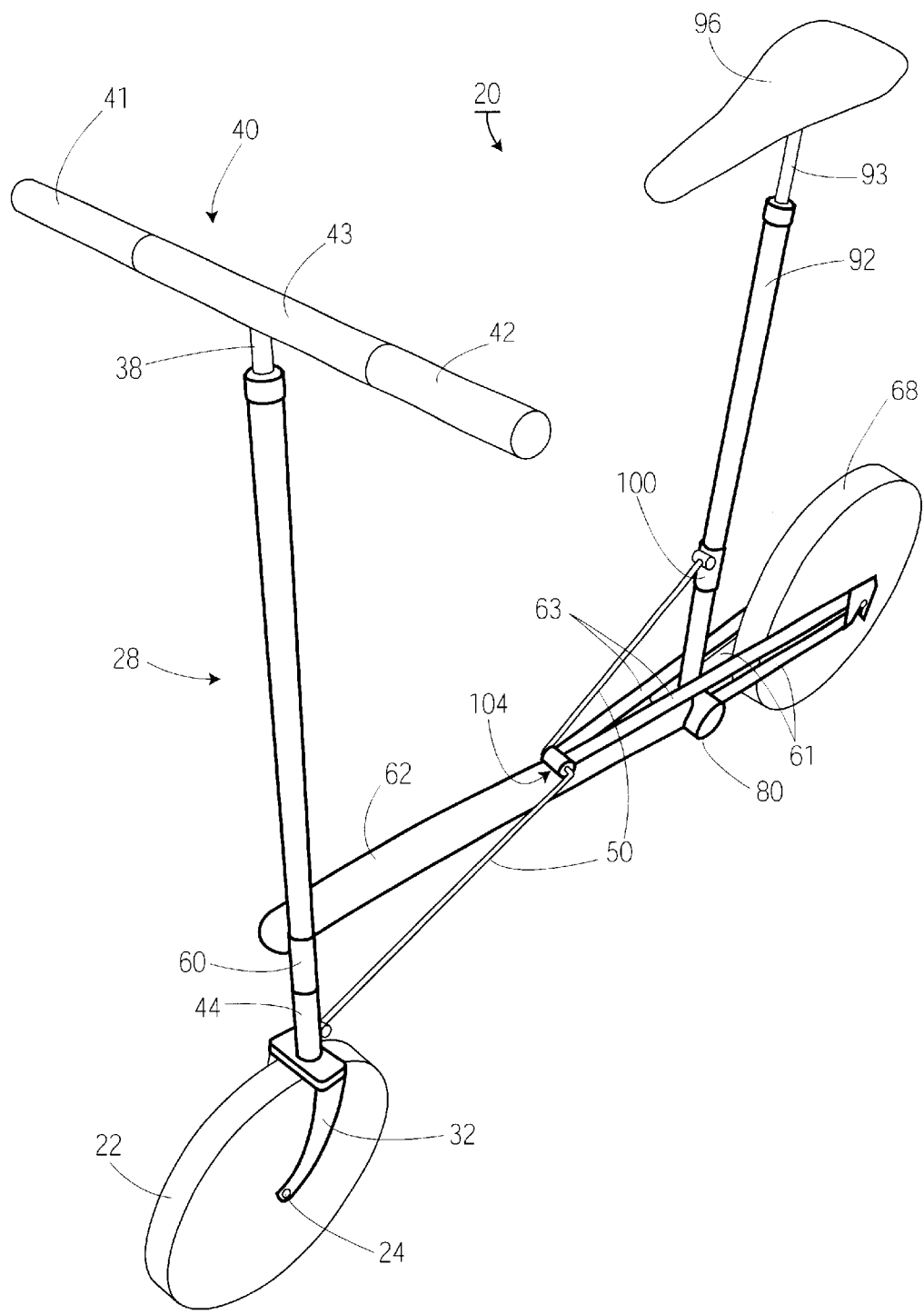
FIG. 6 is a perspective view of the bicycle in an opened configuration.
Figure 7:
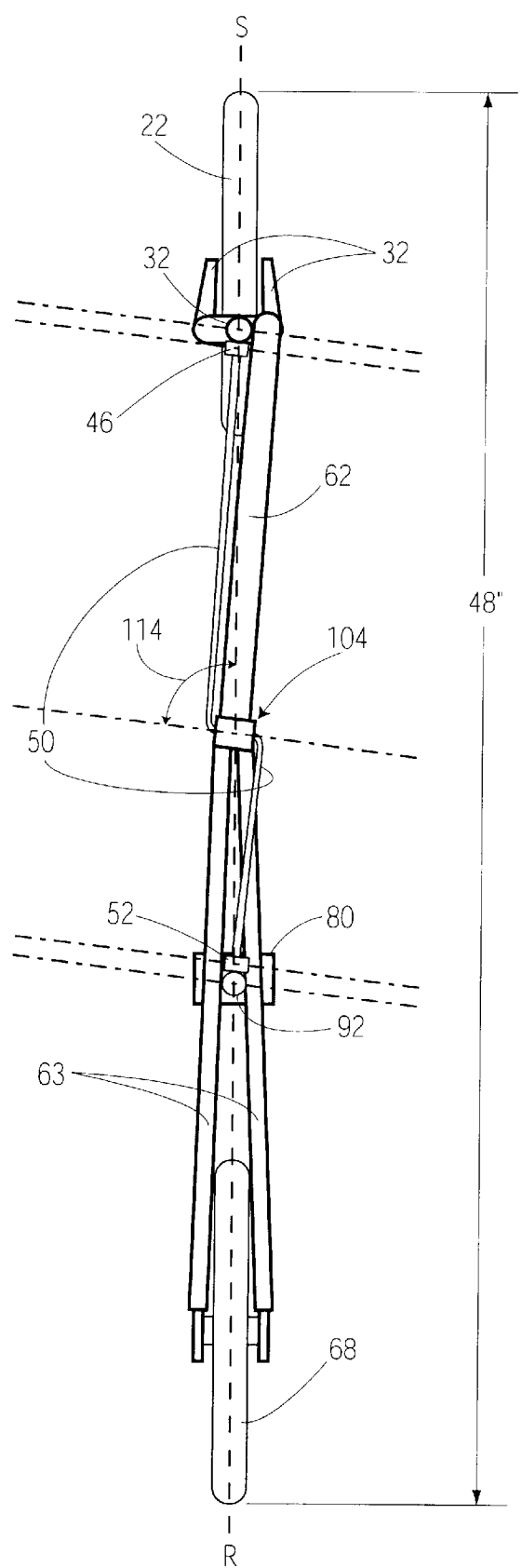
FIG. 7 is an orthographic top view of the bicycle in an opened configuration.

Referring to FIGS. 1 and 6, depicted therein is a collapsible bicycle 20 in an opened or unfolded configuration. Also referring to FIGS. 2–5, there are depicted various views of the bicycle in a semi-collapsed or folded configuration (FIG. 2) and a fully collapsed or folded configuration (FIGS. 3–5).

In the opened configuration, the bicycle has an overall length of approximately 48 inches and a height of approximately 43 inches although the design may be scaled to larger and smaller dimensions. The bicycle includes a front wheel 22 that is attached to rotate about an axle 24 passing through the center of the wheel and connecting it to a front fork 32. It will be appreciated by those skilled in the design of bicycles that the wheel 22 preferably includes a rim and spokes connecting the rim to a hub with friction bearings, bushings or similar mechanisms suitable for reducing the friction between the wheel hub and the axle. Front wheel 22 is preferably comprised of a rubberized or equivalently resilient outer layer, preferably inflatable, mounted on a spoked rim. Alternatively, wheel 22 may be a spokeless or continuous-hub wheel design.

The front wheel 22, having a diameter between 6 and 24 inches and preferably a 12 to 20 inch diameter, is releasably affixed to the steering assembly 28 by threaded ends of the axle 24 that may be used to releasably fasten the axle to the forks 32 of steering assembly 28. Steering assembly 28 further includes a shaft 34 that is rigidly connected to the fork 32 and which terminates at an upper end with a steering member 40. Steering member 40 is preferably a conventional set of handlebars or similar steering mechanism (e.g. T-handle, steering wheel, yoke, etc.) that allows an operator to control the direction of the bicycle as it moves. Steering member 40 may also be a collapsible design, wherein ends 41 and 42 slide within horizontal tube 43. As an alternative, the handlebar may be a folding design, wherein the handlebar pivots or collapses into a smaller profile for storage of the bicycle. Shaft 34 is pivotably controlled through the head tube 44 (including headset) in a manner similar to a conventional bicycle steering mechanism. The conventional steering mechanism is pivotally attached at front point 46 to one end of a horizontal stay 50. The various pivoting points and sliding sleeves in the present invention may include low-friction "washer" or "bushing" material such as Teflon®, Nylon®, Delran®, or similar commercially available products to provide a low-friction interface between moving members, however a lubricated metal-metal surface may also be suitable.

In addition to steering member 34, steering assembly 28 further includes a compression fitting 36 suitable for receiving down shaft 38 of a steering member 40. Shaft 34 is pivotably controlled at location 44 using a conventional bicycle steering mechanism or headset as will be familiar to those skilled in the art.

In a preferred embodiment, the front wheel is spaced slightly ahead of the axis of rotation 48 of the steering assembly. By offsetting the axle 24 of the front wheel 22 between 1 to 4 inches ahead of the steering axis, control of the bicycle is significantly improved over designs with smaller or no forward offset.

Also connected to steering assembly 28, preferably via a slidable sleeve 60 is a down tube 62. Down tube 62 includes, at an opposite end, a chain stay 61 and seat stay 63 that together define an opening for receiving the rear or drive wheel 68; also a 12 to 20 inch diameter wheel. Attached midway along longitudinal member or down tube 62 is a crank assembly 70 that includes pedals 72, cranks 74 and a chain ring 76, all of which rotate about the center of the crank assembly at location 80. The various tubes and stays of the present invention would be constructed of steel or similar alloy tubing of a generally cylindrical or oval cross-section as is well-known in the bicycle fabrication industry, and the pivot points and associated bushings used to connect the pivots may be welded or brazed to the tubing, with or without associated reinforcement.

In one embodiment, the drive wheel is driven by a chain 82 that is operatively connected between the chain ring 84 of the crankset and a freewheel or drive sprocket (not shown) connected to the drive wheel. The drive sprocket may further include a coaster brake mechanism operatively interconnected therewith.

Figure 20:
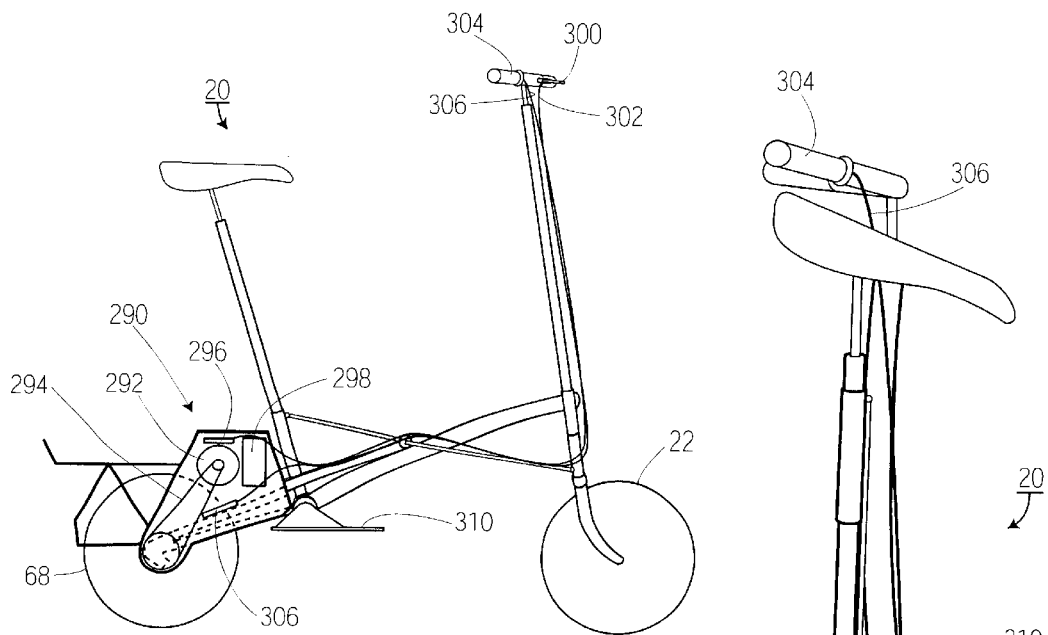
FIGS. 20 and 21 are illustrations of another optional embodiment of the collapsible bicycle of FIGS. 18 and 19 with a propulsion system.

Although not depicted in all the figures, it will be appreciated that the crankset, freewheel and chain assembly is of a conventional design suitable for converting kinetic energy of an operator to driving force suitable for causing the drive wheel to rotate. It will also be appreciated that alternative drive mechanisms may be employed, including alternatives to the typical rotating crank system that include electromotive or similar alternative power systems that replace or supplement the energy applied by the operator as further depicted in FIGS. 20 and 21 and described below. It will be further appreciated by those skilled in bicycle design that various alternative braking mechanisms are available and are equivalent substitutes to a coaster brake mechanism on the rear wheel 68. For example, as depicted in FIG. 20 a hand-operated brake-lever 300 may be employed, via cable 302, to operate a center-pull caliper brakes 306, as found on conventional bicycles. Alternative braking mechanisms such as hand-operated disk brakes as found on motorcycles may also be used.

Also connected to down tube 62 is a seat assembly 90. Seat assembly 90 is preferably pivotably connected to down tube 62 at a pivot location 97 in close proximity to the bottom-bracket shell. The seat assembly, like the steering assembly, preferably includes a circular tube 92 of a size that is suitable for receiving a standard seat post 93 therein so as to allow the saddle or seat 96 to be adjusted in height to the size and preference of the operator. As an alternative, the seat 96 may be in the form of a bench-type seat or padded bar that a user may sit on while pedaling or coasting. This alternative may result in a reduced overall profile as a bench-type seat or bar may be further collapsed or folded.

In addition to being pivotally connected at its lower end to down tube 62, seat assembly 90 is slidably connected to horizontal stay 50 via sleeve 100. Moreover, horizontal stay 50 is preferably pivotably connected to member 62 at location 104. It will be further appreciated that in an alternative embodiment (not shown), longitudinal horizontal stay member 50, although illustrated as a single tube, may be replaced with a pair of rigid bars, tubes, or similar structural members. As depicted in FIG. 1, the application of moderate upward force at the sleeves (60 and 100) will result in the bicycle being collapsed into a configuration as depicted in FIG. 2 and ultimately FIG. 3.

Figure 2:
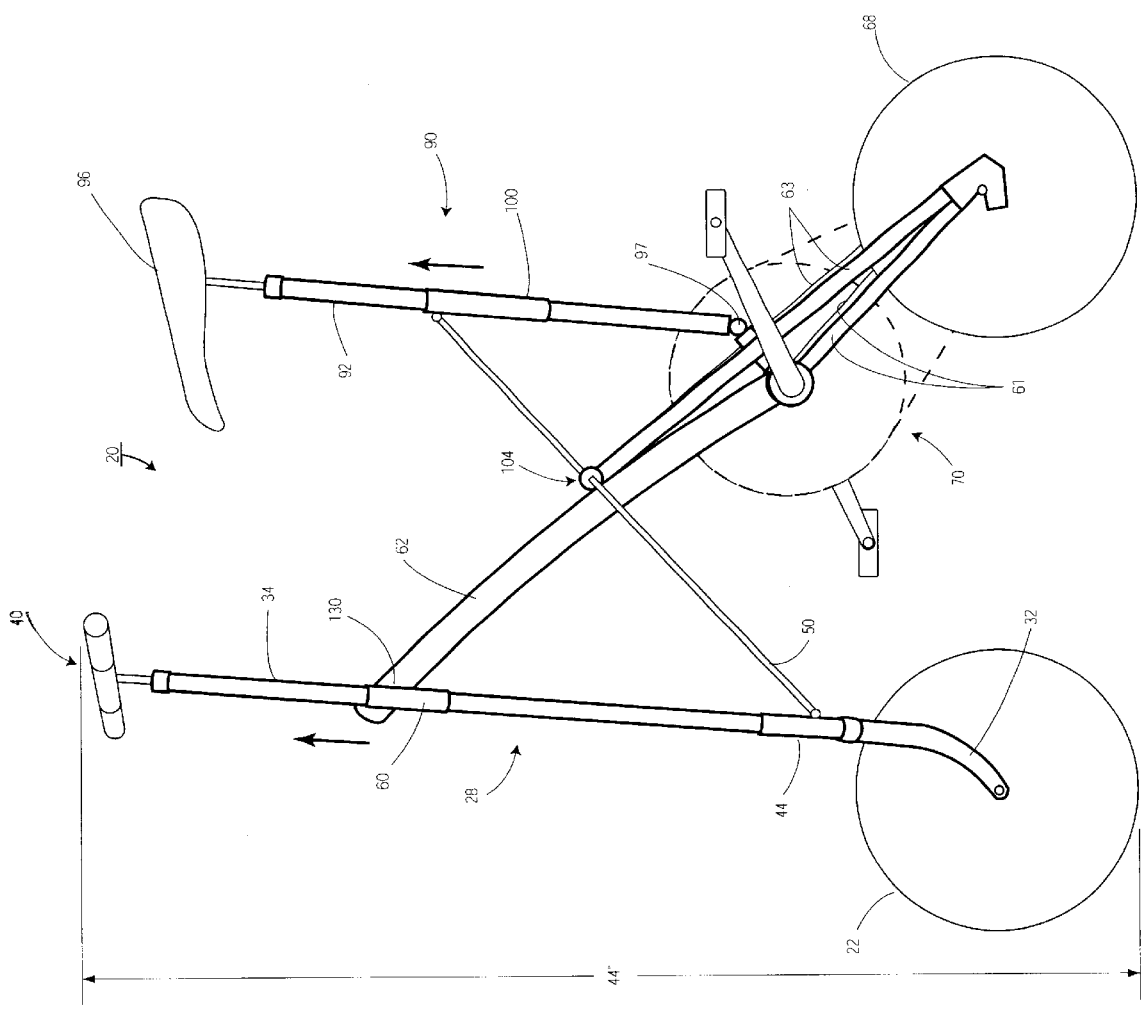
FIG. 2 is an orthographic left side-view of the bicycle in a partially collapsed configuration.

Referring to FIG. 2 in conjunction with FIG. 1, it is seen that in a partially collapsed state, the pivot relative to one another at pivot location 104, and where sleeves 60 and 100 move up tubes 34 and 92, respectively. This "X-shaped" collapsing configuration retains the rigidity of the bicycle, yet provides for a significantly reduced profile when the bicycle is fully collapsed. FIG. 2 also depicts the pivot point 97 near the bottom of seat assembly 90. It will be further appreciated that pivot location 104 may further include an optional torsion spring that biases the down tube 62 and horizontal stay 50 toward a collapsed position in order to assist a user in collapsing the bicycle.

Referring to FIGS. 3–5, the present invention is depicted in a collapsed configuration. In particular, sleeves 60 and 100 have been moved to the tops of tubes 34 and 92, respectively. Also, members 50 and 62 have been pivoted about the center pivot point 104, thereby compressing the overall length of the bicycle to less than one-third of its "open" length while only slightly increasing the height of the bicycle. In the collapsed configuration, the bicycle only occupies a space of about 12 inches in length by about 44 inches high, a size suitable for storage against a wall within a typical coat or utility closet or in a hallway as further depicted in FIG. 16.

As is apparent from FIGS. 3–5, an angled or canted pivoting mechanism 130 that connects down tube 62 to sleeve 60, in combination with a slight bend in the down tube, allows the bicycle to be collapsed with the constituent components; particularly with the wheels positioned adjacent one another. The down tube is bent at an angle of approximately 5 degrees at pivot location 104.

When completely folded, the horizontal stay 50 and the down tube 62, as well as both the seat tube 92 and steering tube 34 are in an almost parallel relationship. Such a configuration reduces the volume in which the bicycle may be stored. It will be further appreciated from the illustrations that the cant or angle of the pivot mechanism is such that it allows the bicycle to collapse completely, but does not result in any impact to the alignment of the components when the bicycle is fully opened. Referring also to FIG. 6, there is illustrated the angular relationship of the down tube and horizontal stay 50 at each point where horizontal stay 50 is connected (center pivot 104 and front and rear pivots 46 and 52, respectively) relative to the center-line R-S of the bicycle. In general, the angular orientation of each pivot is the same, and is on the order of 75–85 degrees from the center-line as indicated by angle 114. This design, in particular, relies upon a constant linear alignment of the front sleeve 60, pivot point 104, bottom bracket shell 80 and the rear wheel 68 along the reference line P-Q as indicated in FIG. 4. Accordingly, the canted pivot may allow the bicycle to collapse but is of no impact when the bicycle is fully opened. Absent the canted pivots and non-linear down tube 62, the present invention would still allow the bicycle to be collapsed, albeit with the constituent components (wheels, steering assembly, seat post, etc.) remaining aligned in a generally coplanar fashion.

Referring next to FIGS. 8–10 there are illustrated various details pertaining to the operation of a locking mechanism on the sliding head tube 60. To lock the sliding head tube 60 into position a pin 120 is engaged into a slot or groove 122 around the circumference of steering tube 34 that allows steering. The purpose of locking the head tube 60 in a down position is to keep the bicycle 20 rigid even during inconsistent forces. For example, when a rider hits a bump while riding or when a rider gets off the bike and lifts it off the ground. However, as previously described, a locking mechanism is not necessary to keep the bike in the open or ridable configuration.

In this locking embodiment, a handle 126 is pivotably attached to the sliding head tube 60 at the top with a spring-loaded hinge, and the handle has a pin 120 extending from the bottom thereof. When the bicycle is in the open position, pin 120 intersects or protrudes through a hole 128 within the sliding head tube and intersects with the slot 122 of the steering tube 34 as depicted in FIG. 10. To release the locking mechanism and collapse the bicycle an operator pulls outward on the bottom of the handle as depicted by arrow 130, and the pin is disengaged so as to unlock the sliding head tube. The bike can then be easily collapsed by continuing to pull upward on the handle 126. It will be appreciated that the locking mechanism handles could be integrated with the sleeve so that a pull on the handles disengages the locking mechanism and allows the bicycle to be folded or unfolded.

In a further aspect of the locking mechanism depicted in FIG. 9, the pin 120 is held in the unlocked or outward position by a notch 134 to keep the pin from sliding along the outer diameter of steering tube 34. When the bike is returned to the open position, a collar 136 interferes briefly with the pin, allowing the spring-loaded hinge to cause the pin to move inward and engage the slot. The advantages of this type of locking mechanism is that it is ergonomically beneficial and it involves the operator's entire hand which keeps fingers out of the way of moving components.

Figure 11:
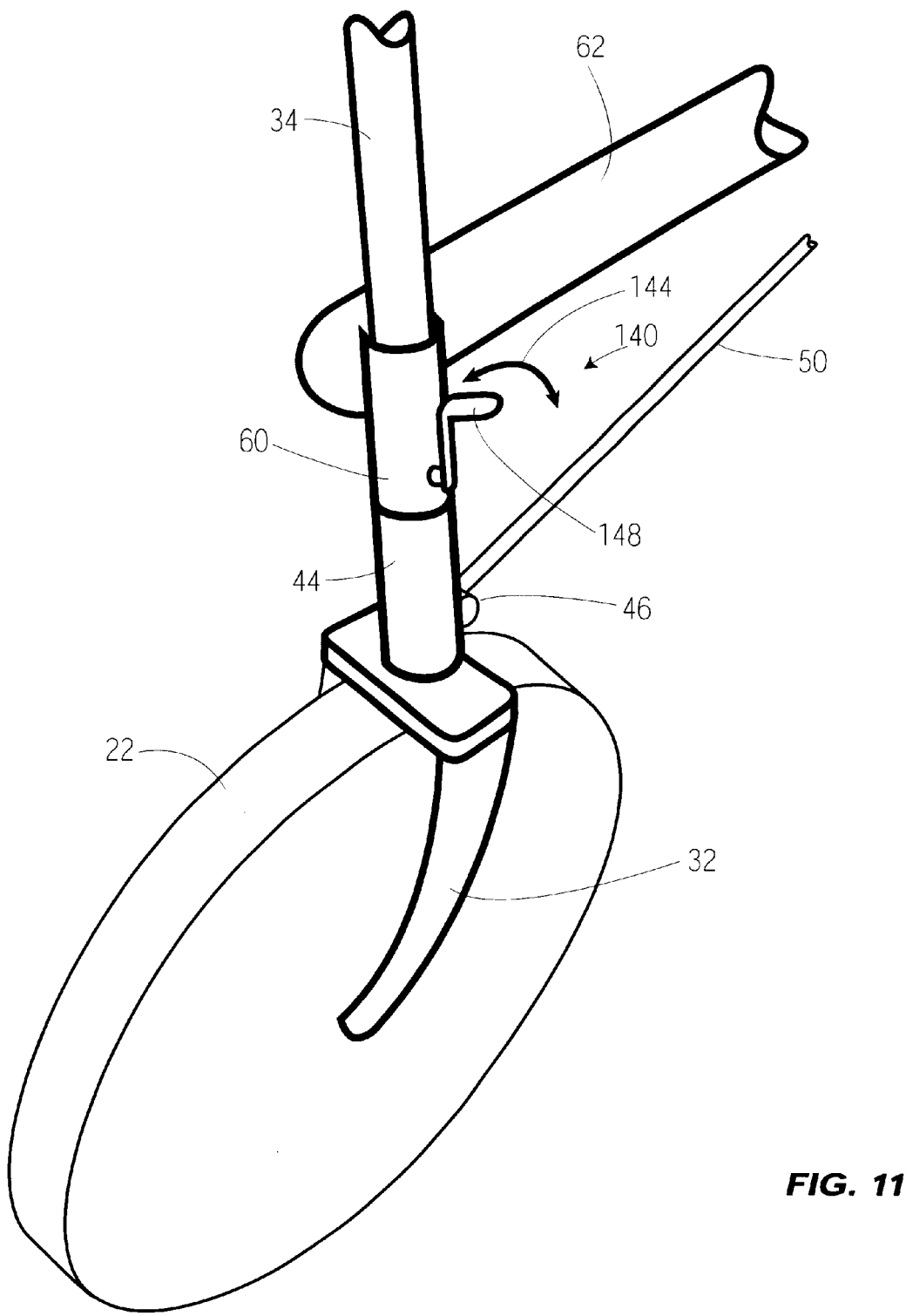
FIGS. 11–13 are illustrations of alternative locking mechanism on the sliding head tube.

Referring next to FIG. 11, there is illustrated an alternative locking mechanism 140. In particular, sliding head tube 60 is pivotally attached to the down tube. To lock the sliding head tube into position a threaded pin 142 is rotated into or out of a hole in the sliding tube so as to engage or disengage a slot within the steering tube 34 as previously described with respect to FIG. 9. As illustrated by arrow 144, handle or crank 148 is rotated in a clockwise direction to cause the pin to engage the slot (not shown) and in a counter-clockwise direction to release the lock and move the pin outward so as not to interfere with the sliding of the head tube 60 along the steering tube 34 when the bicycle is collapsed.

Figure 12:
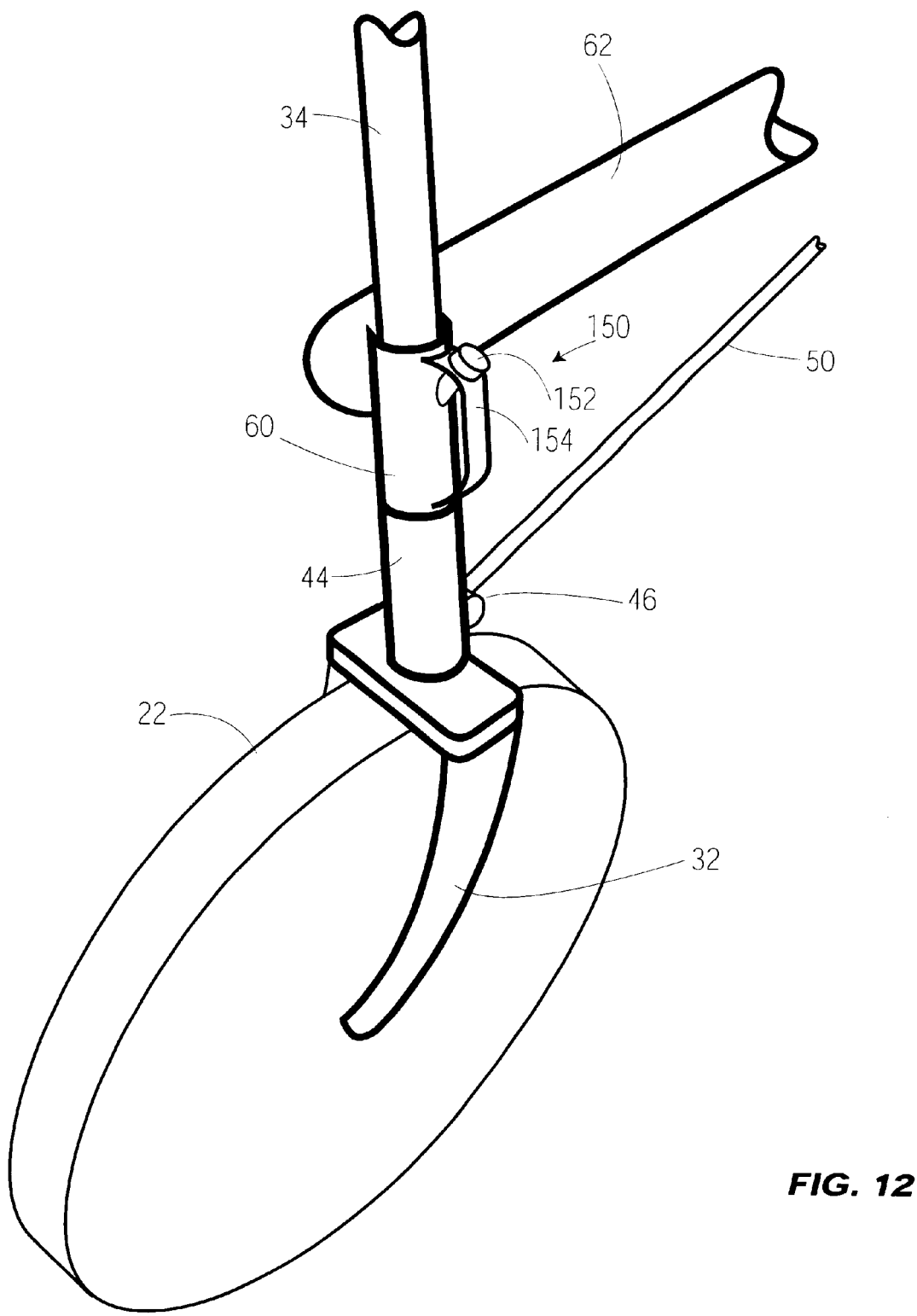
Figure 13:
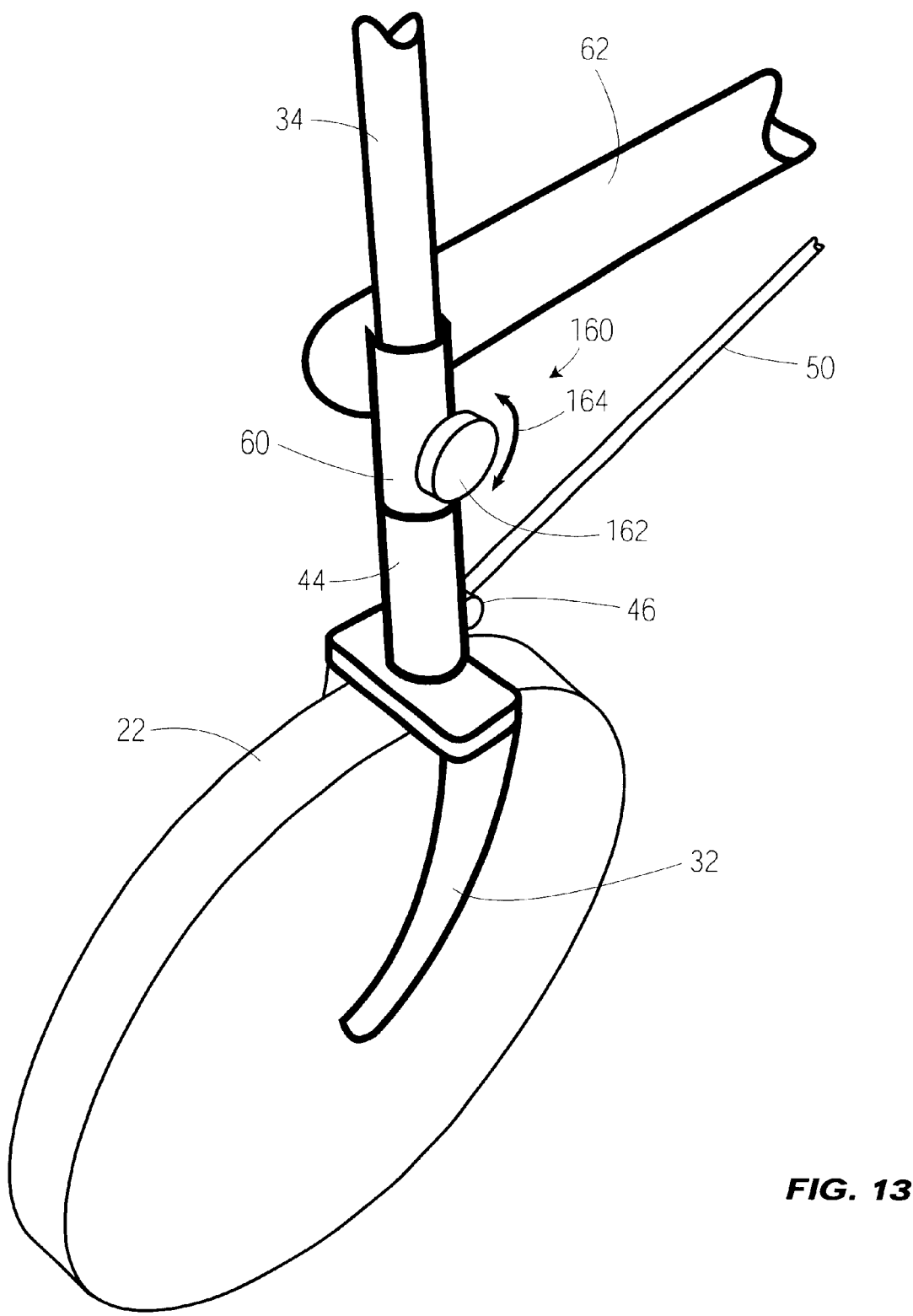

Referring to FIGS. 12 and 13, there are depicted two additional alternative locking mechanisms 150 and 160. FIG. 12 depicts a push-button-type lock wherein a tab or button 150 must be depressed or pulled to release the lock as the user pulls upward on handle 154. In a manner similar to that depicted in FIG. 11, mechanism 160 includes a knob 162 that is rotated in the direction indicated by arrows 164 to insert or retract a threaded locking pin (not shown). It is further contemplated that knob 162 may be a spring-loaded knob that is pulled away from the head tube 60 in order to disengage the pin from the steering tube slot.

Figure 14:
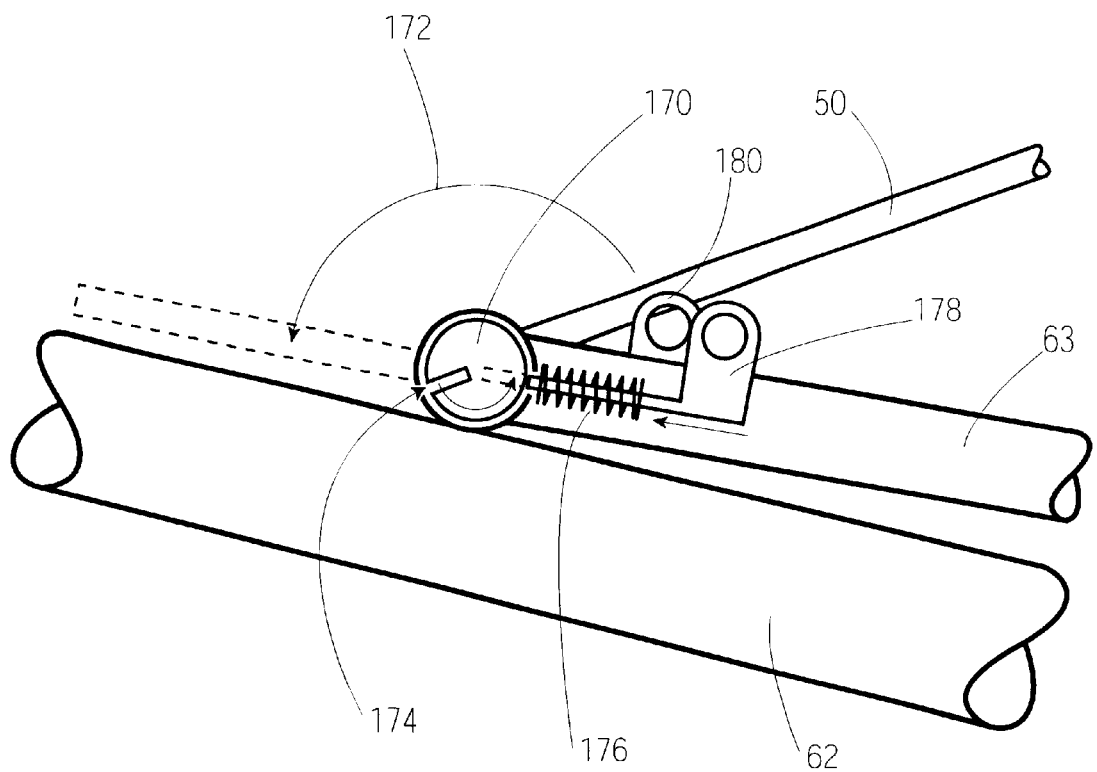
FIG. 14 is an illustration of a locking mechanism on the down tube to keep the bicycle in a collapsed configuration.

Referring next to FIG. 14, there is shown a cutaway view of a locking mechanism positioned on the down tube 62. In particular, a cam 170 at the center of the seat stay tubes 63 is operatively associated with horizontal stay 50 and pivots therewith as the horizontal stay moves in the direction of arrow 172 as the bicycle is collapsed. When the stay 50 and the cam 170 are rotated to a folded configuration (dashed line representation), a void or detent 174 within the cam aligns itself with the locking pin, and the spring-loaded pin is inserted therein. The spring 176 would work to slide the pin into the void in cam 170. To release the pin an operator would pull 178 tab away from the cam to remove the pin from the cam allowing it to rotate, hence unfold the bike. While in the collapsed position the locking tab will align with a permanent tab 180, each having holes therethrough suitable for insertion of a security lock (not shown) to deter the theft of the bicycle. The security lock could be an after-market type or the lock could be built into the mechanism, allowing release of tab 178 only when the lock was opened.

Figure 15:
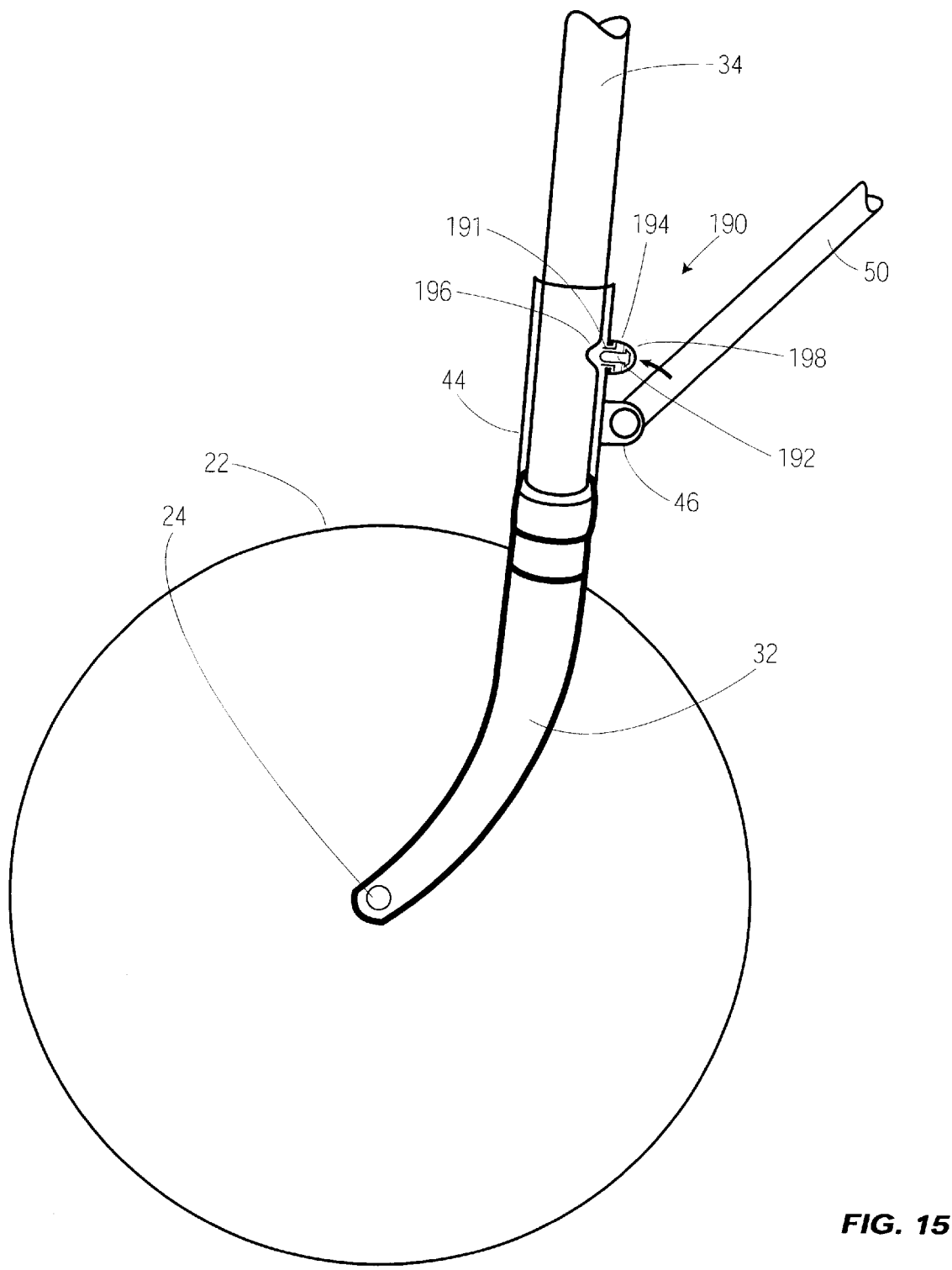
FIG. 15 is a detailed illustration of a mechanism for retaining the front wheel in a forward position while the bicycle is in a collapsed configuration.

FIG. 15 depicts a mechanism for retaining the front wheel in a forward position while the bicycle is in a collapsed configuration. The advantage of such a system is that it is easier to move the collapsed bicycle by rolling it on its wheels. The bike cannot be completely collapsed without the front wheel being at least partially facing forward. Taking advantage of this fact, mechanism 190 incorporates a spring-loaded pin 192 within a bushing 191 that is threaded or otherwise retained within hole 194 in sleeve 44. The interior end of pin 192 intersects and is inserted within a recess or detent 196 in steering tube 34. The pin would likely include a rubber cap 198, that is expandably connected onto a shoulder of bushing 191 extending from the sleeve 44, and would further provide a spring action or force to remove the pin from the recess and also to provide a cushion to absorb excess pressure from the horizontal stay tube 50 when it strikes the pin in the collapsed configuration.

Figure 16:
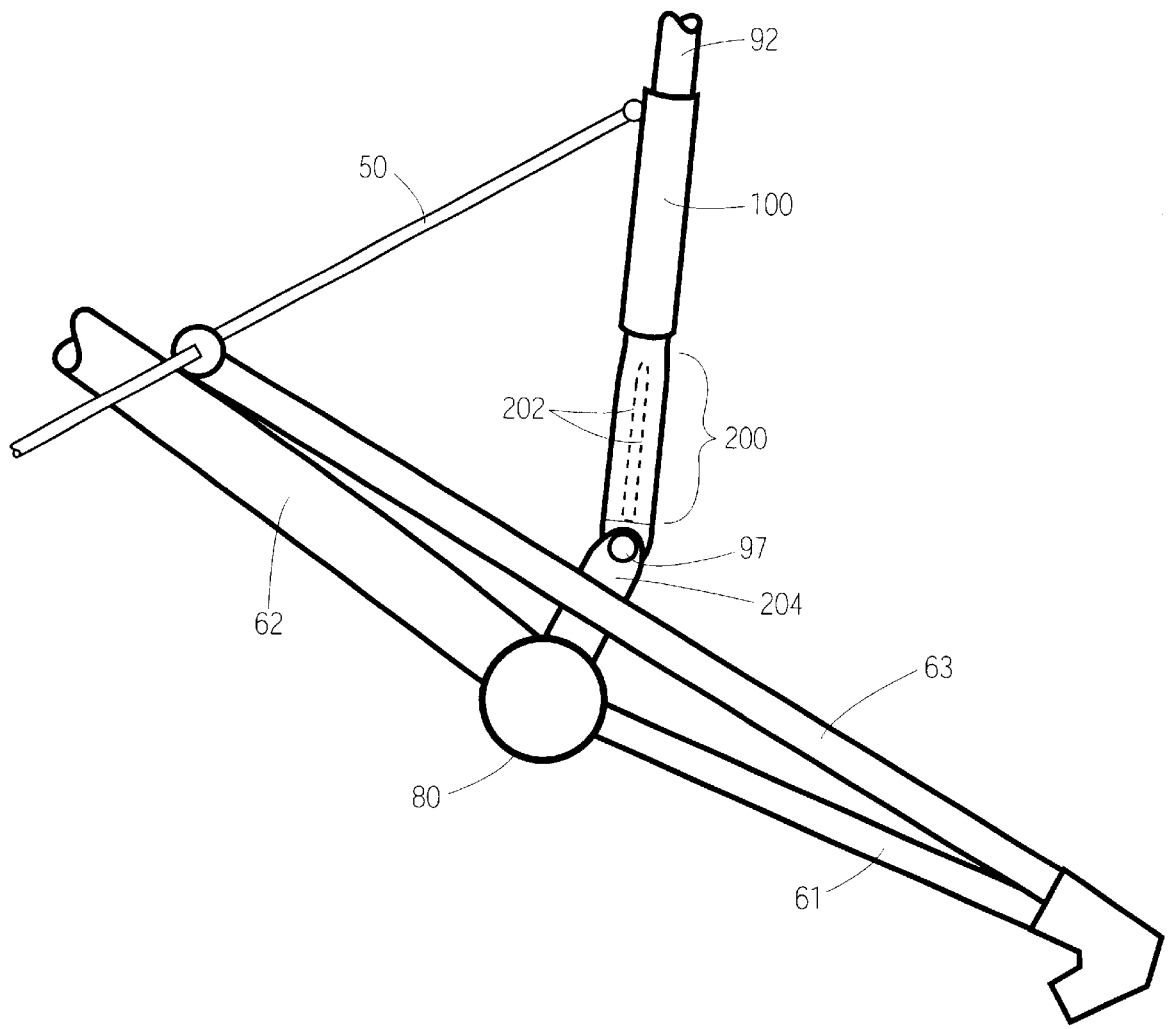
FIG. 16 is a partial view of stays and seat down tube, illustrating the flared configuration of the seat-tube to reduce the "play" in the seat-tube slide when the bicycle is in the opened configuration.

Turning to FIG. 16, there is depicted a partial view of the stays and seat tube. In particular, seat tube 92 includes at the lower end thereof, just above pivot point 97, a flared or expanded portion 200. Such a configuration would reduce the "play" in the seat-tube slide 100 when the bicycle is in an opened configuration, while the reduced diameter for the upper portion of seat tube 92 would allow the sleeve 100 to easily slide along the balance of the tube. It is further contemplated that flared region 200 may further include ridges or flutes 202 so as to allow easier sliding of the sleeve 100 thereover, while providing the additional rigidity offered by the expanded diameter in region 200. Alternatively, region 200 may be built-up by adding material to the seat tube 92 in the region, for example, by brazing or welding. It is further contemplated that sleeve 100 may be slightly extended so as to "encapsulate" pivot point 97 and the base 204 so as to stiffen the joint during operation of the bicycle.

Figure 17:
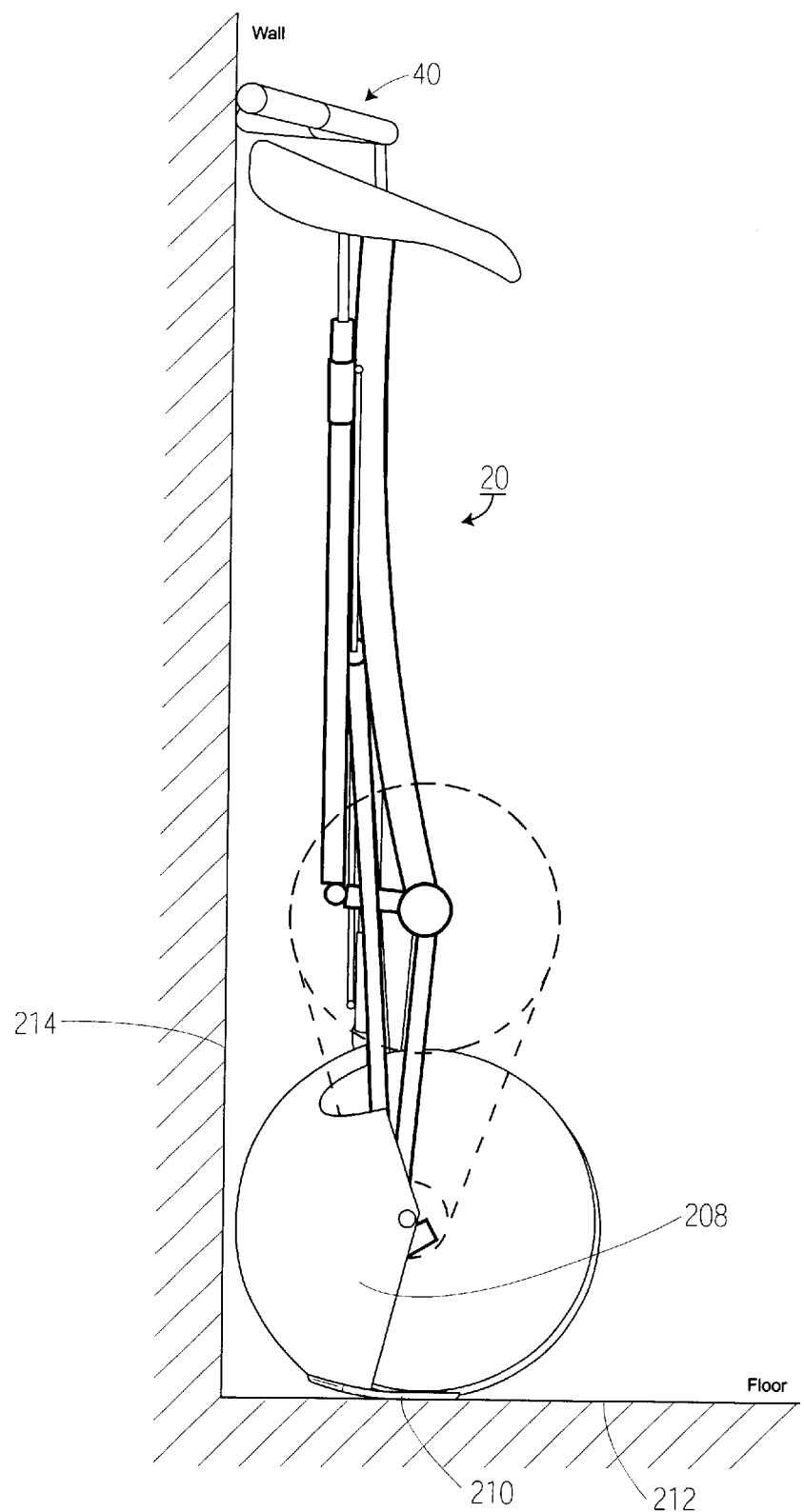
FIG. 17 is an orthographic right side-view of the bicycle and a fender-stand in a collapsed or folded configuration.

Referring next to FIG. 17 there is shown an orthographic view of the bicycle and a fender-stand in a collapsed or folded configuration. In particular collapsible bicycle 20 further includes a fender-stand 208 that includes a resilient mudguard 210. In addition to preventing the spray of mud and water, guard 210 is designed with a wide, flat surface that facilitates storage of the bicycle in a collapsed configuration. More specifically, when stored in an upright position on a floor or similar horizontal surface 212, and against a wall 214, the bicycle stands on the mudguard and has the ends of handlebar assembly 40 touching the wall for stability. It will be further appreciated that the mudguard may also include a reflective surface and or lighting as may be required for safety.

Figure 18:
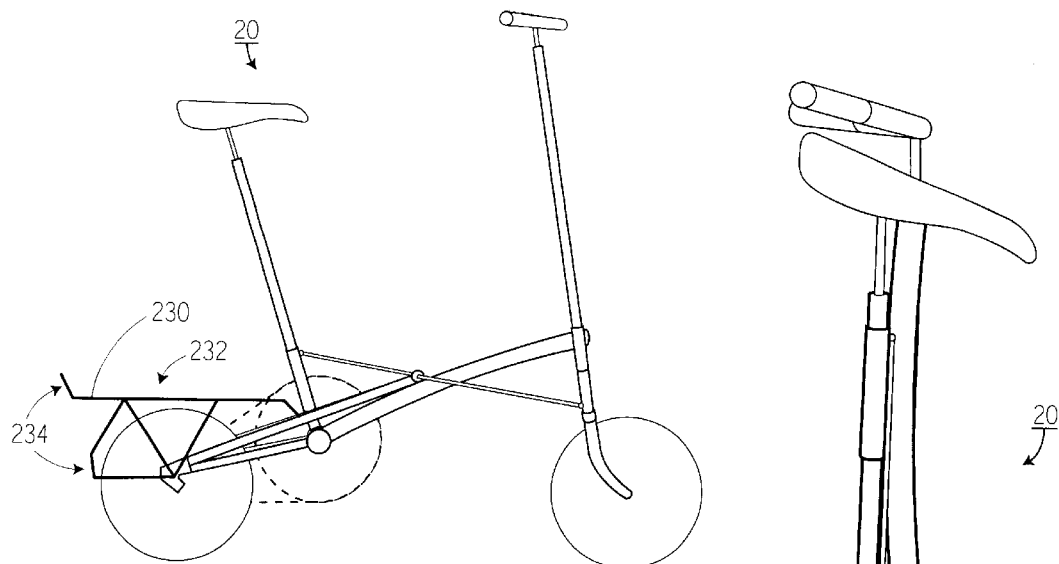
FIGS. 18 and 19 are illustrations of an optional embodiment of the collapsible bicycle with a rear rack-stand.
Figure 19:
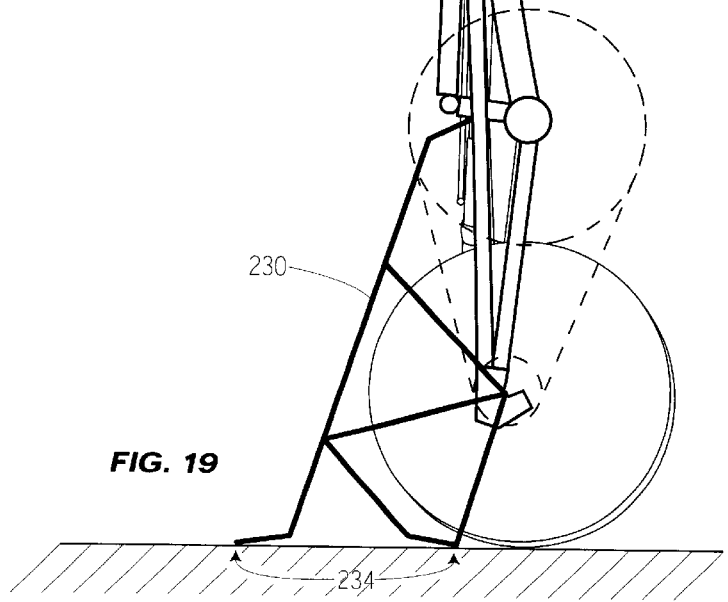

FIGS. 18 and 19 are illustrations of an optional embodiment of the collapsible bicycle with a rear rack-stand 230. The stand may be of numerous designs, essentially including a first horizontal surface 232 when the bicycle is opened, and rearward surface(s) 234 that serve as a "stand" when the bicycle is collapsed and stood upright. The rack may also hold panniers on the sides.

Figure 21:
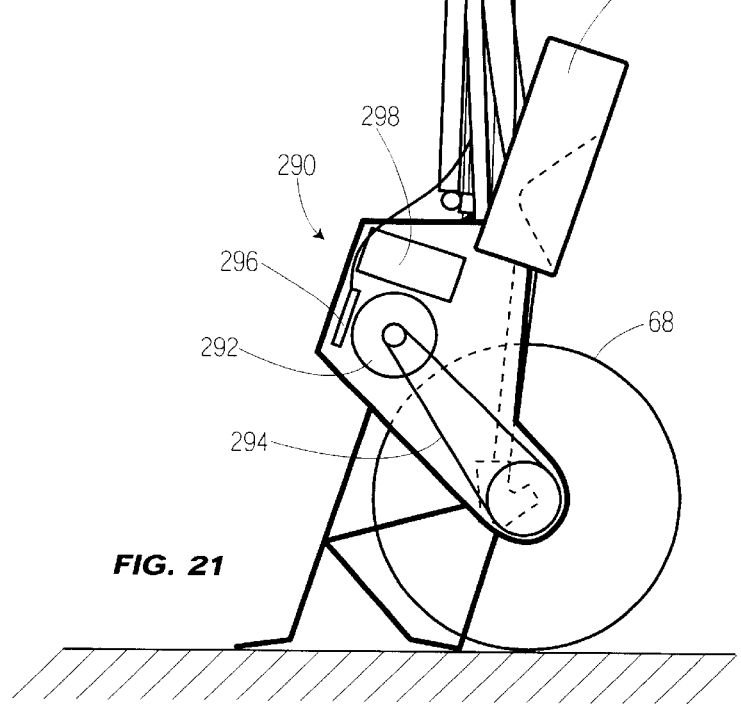

FIGS. 20 and 21 are illustrations of another optional embodiment of the collapsible bicycle of FIGS. 18 and 19 with a propulsion system 290. System 290 preferably includes a motor 292 operatively connected to the read or drive wheel 68 via a chain or belt 294. It will be appreciated that the bicycle may be operated, using such a propulsion system in a powered mode or a power-assist mode, the former not requiring pedals, etc. and the latter requiring an override or clutch mechanism for the power assist. Motor 292 may be either an electric or combustion type, respectively relying on a batter or fuel source 298. The motor would preferably operate in response to a controller (also controlling ignition, etc.) that in turn is responsive to a throttle control device such as a twist-grip throttle 304 connected to the controller via a cable 306 (mechanical linkage or electrical connection).

Alternatively, the motor 292 could be operatively associated with the rear wheel 68 using a friction drive in direct contact with a surface of the wheel as is employed in well-known battery assist devices for bicycles. Furthermore, in the event that the propulsion system is used in a powered mode, the crankset and pedals could be replaced with stationary foot rests 310 that preferably fold upward as depicted in FIG. 21 so as to minimize storage space.

As another alternative, the bicycle drive assembly and/or drive wheel may be outfitted with a plurality of changeable gears (e.g., at least a rear derailleur) so that an operator may select a desired gear for pedaling. It will be further appreciated that such an alternative will require a control mechanism (e.g., gear shift) and cabling in order to enable the operator to shift the gears.

In recapitulation, the present invention is a collapsible transportation device or vehicle such as a bicycle and more particularly a bicycle that may be collapsed, in greatly compressed fashion, to reduce the size of the apparatus for shipping and/or storage.

It is, therefore, apparent that there has been provided in accordance with the present invention a collapsible vehicle or transportation apparatus, wherein the bicycle comprises a down tube and a horizontal stay that are pivotally connected to one another at midsections thereof as well as being slidably connected to steering and seat assemblies, respectively. The arrangement of the various members and assemblies provides a rigid structure to support an operator during use yet allows the bicycle to be collapsed to a compact size for storage and shipping. The bicycle may be folded or collapsed in the form of an "X", bringing the wheels into a side-by-side position, to reduce its overall size without compromising its structural rigidity when reopened. The arrangement of the various members and assemblies provides a rigid structure to support an operator while allowing the bicycle to be collapsed to a compact size for storage and shipping. The bicycle may be folded or collapsed, in a generally coplanar fashion so as to reduce its overall size without compromising its structural rigidity when reopened. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A two-wheeled vehicle, comprising:
    a first wheel rotatably affixed to an axle passing therethrough;
    a drive wheel rotatably affixed to an axle passing therethrough;
    a steering assembly operatively connected to the axle of the first wheel so as to cause the first wheel to pivot about a generally vertical axis under the control of an operator, thereby enabling the first wheel to change the direction of the two-wheeled vehicle;
    a down tube having a first end slidably connected to said steering assembly, and a second end suitable for connection to said drive wheel;
    a seat assembly including a first end pivotably connected to said down tube and a second end upon which a seat to support the operator is adjustably attached; and
    a horizontal stay having a first end slidably connected to said seat assembly, and a second end pivotably affixed to said steering assembly, wherein the two-wheeled vehicle may be collapsed to a smaller size by slidably moving the down tube and horizontal stay members relative to the steering and seat assemblies, respectively.

2. The two-wheeled vehicle of claim 1, wherein the down tube is pivotably connected to the horizontal stay.

3. The two-wheeled vehicle of claim 2, wherein a pivotable connection between the down tube and the horizontal stay is located between the first end and the second end of the down tube and is located between the first end and the second end of the horizontal stay.

4. The two-wheeled vehicle of claim 3, wherein the pivotable connection is located midway between the first end and the second end of the horizontal stay.

5. The two-wheeled vehicle of claim 1, further comprising a drive assembly for an operator to impart a kinetic force to said drive wheel.

6. The two-wheeled vehicle of claim 5, wherein the drive assembly comprises:
    a chain ring;
    a pair of crank arms operatively connected to said chain ring and extending radially from a drive assembly axle;
    a pair of pedals, wherein each pedal is pivotably connected to the end of each of said pair of crank arms;
    a drive chain, passing around an outer perimeter of said chain ring and over a drive sprocket operatively interconnected to said drive wheel.

7. The two-wheeled vehicle of claim 6, wherein the drive assembly axel is operatively affixed to said down tube.

8. The two-wheeled vehicle of claim 7, wherein the drive assembly axel is affixed to said down tube at a position in proximity to the pivotable connection between said seat assembly and said down tube.

9. The two-wheeled vehicle of claim 1, wherein said down tube comprises an alloy steel tube.

10. The two-wheeled vehicle of claim 9, wherein said down tube comprises a generally circular cross section of alloy steel tubing having a diameter of about 1.5 inches.

11. The two-wheeled vehicle of claim 1, wherein at least one of the pivotable connection has a locking mechanism associated therewith.

12. The two-wheeled vehicle of claim 1, wherein at least one of the slidably connected ends further includes a pivot associated therewith.

13. The two-wheeled vehicle of claim 1, wherein at least one of the slidably connected ends includes a non-abrasive bushing placed between the outer diameter of the assembly and the inner diameter of a respective longitudinal member.

14. The two-wheeled vehicle of claim 1, wherein the steering assembly has a fork member that positions the axle of the fist wheel in a position that is spaced ahead of the axis of rotation for said steering assembly.

15. The two-wheeled vehicle of claim 1, wherein each of the pivots are about a substantially horizontal axis.

16. The two-wheeled vehicle of claim 1, further comprising a propulsion system to impart a kinetic force to said drive wheel.

17. The two-wheeled vehicle of claim 1, further comprising a fender-stand that includes a mudguard that facilitates storage of the bicycle in a collapsed configuration.

18. The two-wheeled vehicle of claim 1, further comprising a rear rack-stand including at least one surface that serves as a stand when the bicycle is collapsed and placed in an upright position.

19. A bicycle, comprising:
    a front wheel rotatably affixed to a steering assembly, wherein the steering assembly enables a user to change direction of the bicycle;
    a down tube having both a pair of chain stays and a pair of seat stays, said down tube being slidably connected to said steering assembly;

a drive wheel rotatably affixed between the chain and seat stays of said down tube;

a seat assembly including a first end pivotably connected to said down tube and a second end upon which a seat to support the operator is adjustably attached;

a horizontal stay pivotally connected near its center to the down tube, slidably connected at one end to the seat assembly and pivotally connected at the opposite end to the steering assembly;

wherein the down tube is pivotably attached to a slidable sleeve of the steering assembly and where the pivotably attached down tube in combination with the slidable sleeve, allow the bicycle to be collapsed.

20. The bicycle of claim 19, wherein the down tube is non-linear and is pivotably attached to the slidable sleeve of the steering assembly in a canted fashion and where the non-linear shape of the down tube, in combination with the canted pivot, enable the bicycle to be collapsed in a manner where the front and drive wheels are adjacent one another in a generally side-by-side relationship.

* * * * *